United States Patent [19]

Borras et al.

[11] Patent Number: 4,670,747

[45] Date of Patent: Jun. 2, 1987

[54] ALPHANUMERIC ENTRY SYSTEM HAVING AN ELECTRONIC LOCK FEATURE

[75] Inventors: Jaime A. Borras, Hialeah; Timothy A. Mitchell, Plantation; Ozzie F. Ramos, Sunrise, all of Fla.

[73] Assignee: Motorola, Inc., Schaumburg, Ill.

[21] Appl. No.: 799,710

[22] Filed: Nov. 19, 1985

[51] Int. Cl.⁴ .................. H04Q 7/00; H04B 7/00
[52] U.S. Cl. ..................... 340/825.56; 455/38; 455/73; 340/365 VL; 340/825.44
[58] Field of Search .......... 340/825.31, 825.56, 340/707, 711, 365 VL, 709, 792, 825.31, 825.56, 825.44; 455/73, 74, 38; 179/2 EC, 84 VF

[56] References Cited

U.S. PATENT DOCUMENTS

| | | | |
|---|---|---|---|
| 4,007,443 | 2/1977 | Bromberg et al. | 340/792 |
| 4,147,984 | 4/1979 | Candel et al. | 455/38 |
| 4,161,721 | 7/1979 | Conklin et al. | 340/543 |
| 4,207,555 | 6/1980 | Trombly | 361/172 |
| 4,222,088 | 9/1980 | Burton | 361/172 |
| 4,431,870 | 2/1984 | May et al. | 340/707 |
| 4,437,153 | 3/1984 | Kamiyama et al. | 361/172 |
| 4,445,214 | 4/1984 | Reynolds et al. | 340/825.5 |
| 4,447,850 | 5/1984 | Asher | 361/172 |
| 4,453,042 | 6/1984 | Wolf et al. | 179/84 VF |
| 4,471,352 | 9/1984 | Soulliard et al. | 340/825.44 |
| 4,549,279 | 10/1985 | Lapeyre | 340/365 R |

Primary Examiner—Donald J. Yusko
Attorney, Agent, or Firm—Daniel K. Nichols; Joseph T. Downey; Donald B. Southard

[57] ABSTRACT

An alphanumeric entry system which is provided with an electronic lock-out feature. The keypad entry system of the present invention comprises an alphanumeric keypad having function keys and display, a microprocessor, and an electronically programmable read-only memory device. The display consists of a series of system related menus as well as an alphanumeric display area. One of the system related menus corresponds to a locking feature, which may be activated by a general purpose function key. In the locking mode, the radio keypad toggles between a locked and unlocked condition as controlled by the function keys in accordance with a predefined sequence. The alphanumeric entry system of the present invention is particularly advantageous for use with portable two-way communications equipment which operate in a plurality of radio systems.

7 Claims, 12 Drawing Figures

EEPROM PROGRAMMING FLOWCHART 200 4,670,747

ALPHANUMERIC ENTRY SYSTEM HAVING AN ELECTRONIC LOCK FEATURE

FIELD OF THE INVENTION

This invention relates to the field of portable two-way radio's having keypad entry systems. Specifically, the present invention relates to a method and means of electronically "locking" a keypad from inadvertently activating the two-way radio.

BACKGROUND OF THE INVENTION

Portable two-way radios are becoming more advanced in both form and function. Today, portable two-way radios are being used to communicate with extremely complicated communication systems which automatically switch operating frequencies and signalling protocols. These systems typically provide display message capabilities as well as automatic interface to land-based telephone interconnect systems. One such system is manufactured by Motorola, Inc. and is referred to as a "Trunked Radio System". Trunked Radio systems utilize a central control unit to organize and control the operation of the entire system. Users of the system communicate with the central control unit over a dedicated data channel to request and receive channel access information. During the course of a long conversation, the user may actually switch between several frequencies, as determined by the central control unit. The central control unit also couples to land-line telephone interconnect service, to provide users of the Trunked Radio System access to telephone service via radio. Various aspects and features of trunked radio systems are described in U.S. Pat. No. 4,012,597, Mar. 15, 1977 entitled "Transmission Trunk Multi-Channel Dispatch System with priority Queuing", by Lynk et al., The operation of Trunked radio systems is further described in a Motorola instruction manual no. R4-184B, entitled "System Planner; Trunked Radio Systems", July 1980, and Motorola instruction manual entitled "Trunked System Central Controller", numbers 68P81047E50 and 68P81066E60, available from the Service publications Department of Motorola, Inc., 1301 E. Algonquin Road, Schaumburg, Ill. Trunked Radio Systems interface to conventional telephone interconnect systems through a telephone interconnect control unit. The operation of a telephone interconnect control unit is described in Motorola instruction manual 68P81063E20 entitled "Trunked System Central Controller", available from the address above, said manuals and Patent herein incorporated by reference. Other aspects of Trunked Radio Systems which interface to telephone interconnect service are described in U.S. patent application Ser. No. 637,515, entitled "Dynamic Control of Telephone Traffic on a Trunked Radio System", by Zdunek et al. filed Aug. 8, 1984.

The user units of a trunked radio system must necessarily be configured with a keypad entry system and a display unit. The display unit is used to provide important system and unit status to the user. The keypad entry system provides a means by which alphanumeric and telephone dialing information can be exchanged with the central control unit. In trunking, the keypad entry system serves for quick entry of subfleet selections, which is an alphabetic character from A-P. It also enters alphabetic characters to the display to send them as text data or messages over the control channel or a separate voice channel. In conventional systems, text data could similarly be entered and displayed at the base station. The text data, names, or messages may also be decoded at the base station and provide a command to execute further functions; i.e., a page sequence, a telephone number, or an alarm.

A standard approach to entering alphanumeric characters on a display uses individual keys for each character. This approach has the disadvantage that it requires many keys, and therefore, a large area to be implemented. In portable two-way units, "real-estate" is at a premium, and standard telephone-type keypads are used. Typically, each numeric value for the telephone-type keypad corresponds to three alphanumeric symbols. For example, the numeral 2 corresponds to the letters A, B, and C, etc. All keypad entry systems which use the telephone type keypad are faced with several problems. First, since each key represents more than one character, some means of decoding each key must be provided. However, the letters Q and Z are not represented on the keypad. In addition, each time a key is depressed, some information is entered. Therefore, some means of preventing erroneous information from being entered is essential. Prior keypad entry systems use mechanical switches to disable the keypad when not in use. This requires another switch to be added to the radio controls. Previous designs have not taken advantage of the telephone keypad structure because of the difficulty of retaining electronic information after the radio has been turned off.

SUMMARY AND OBJECTS OF THE INVENTION

In summary, the present invention provides a keypad entry system which is provided with an electronic lock out feature. The keypad entry system of the present invention comprises an alphanumeric keypad having function keys and display, a microprocessor, and an electronically programmable read-only memory device. The display consists of a series of system related menus as well as an alphanumeric display area. One of the system related menus corresponds to a locking feature, which may be activated by a general purpose function key. In this mode, the radio keypad toggles between a locked and unlocked condition as controlled by the function keys in accordance with a predefined sequence.

Accordingly, it is an object of the present invention to provide an alphanumeric system for a portable radio using a telephone-type keypad.

It is another object of the present invention to provide an alphanumeric entry system for a portable radio which may be electronically locked.

It is still another object of the present invention to provide a method and means for easy entry of alphanumeric symbols using a multifunction keypad.

It is yet another object of the present invention to provide a method and means for preventing inadvertent falsing of the operating modes of a portable two-way radio.

DETAILED DESCRIPTION OF INVENTION

Figure 1:
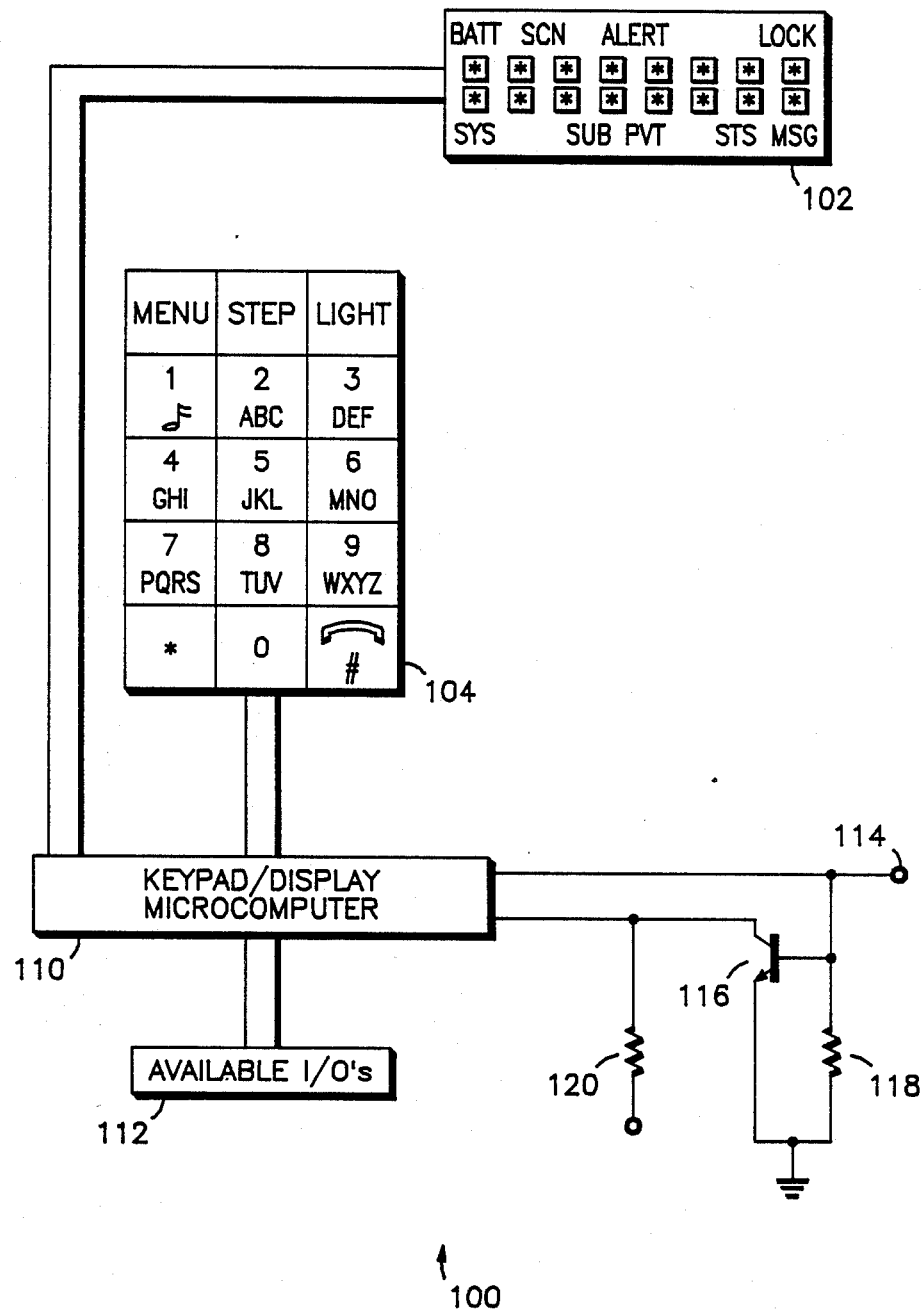
FIG. 1 is a schematic and block diagram of the alphanumeric keypad and display portion of the alphanumeric entry system of the present invention.

FIG. 1 shows the keypad and display unit 100 which is used to implement the alphanumeric entry system of the present invention. The keypad and display unit 100 consists of a display 102 which is coupled to the keypad/display microcomputer 110 through a multiline data connection. The keypad/display microcomputer 110 is also coupled to the keypad 104 through a multiline data connection. The keypad/display microcomputer 110 may also be coupled to other input/output devices through the I/O controller 112. Information generated and displayed by the keypad/display unit 100 is communicated to a radio control microcomputer (described below) through a serial bus interface which is formed by transistor 116 and resistors 118 and 120. The input/output for the keypad/display unit 100 is provided at terminal 114. The keypad/display microcomputer 110 is a 4-bit processor with ROM, RAM input/output ports timer capabilities and LCD drivers all in a single chip. The ROM has been programmed to handle the LCD display, read the keypad, operate the I/O ports, and to encode and interpret the serial bus protocol.

The display 102 consists of two portions. An alphanumeric display portion is provided by a plurality of fourteen segment digits located in the center of the display. A menu portion surrounds the alphanumeric display portion located around the perimeter of the display. A cursor selects the trunking function outlined on the periphery of the display. Once the desired function is selected, then the characteristic of that function could be incremented by depressing the corresponding key (step), for example subfleet or systems. An advantage of this arrangement is that it eliminates a unique control per function, and therefore, it saves real estate area. It also allows other necessary controls to be placed on the top of the radio.

As can be seen in FIG. 1, the menu portion corresponds to several specific functions represented by acronyms. In the preferred embodiment of the present invention, the symbols located in the menu portion are BATT, SCN, ALERT, LOCK, SYS, MSG, PVT, SUB, and SYS. Each of these functions will be described in greater detail below.

The keypad portion 104 consists of two portions as well. The digits 0–9 and each letter of the alphabet are represented on 10 aplhanumeric entry keys. Several function keys are also provided. The funtion keys are represented by the symbols menu, step, light, * and #. The alphanumeric keys may be used to make telephone calls and to enter other radio features. They can also be used in place of the STEP key to directly enter values for System Select or Subfleet Select, etc. The functions provided by these keys will also be discussed in more detail below.

Those skilled in the art will appreciate the hardware connections and requirements for this type of keypad/display arrangement are easily determined from the data manuals which accompany the individual devices, and the present invention is not limited to the specific arrangement described in FIG. 1. However, the operation of these devices as described in conjunction with the flow diagrams below, provides the unique aspects of the alphanumeric entry system of the present invention. The microcomputer 110 may be a HD44790 manufactured by Hitachi Ltd., Semiconductor, I.C. Sales & Service Division, 2210 O'Toole Ave., San Francisco, Calif. 95131.

As mentioned above, a standard approach to entering alphanumeric characters on a display uses individual keys for each character. This approach has the disadvantage that it requires many keys and therefore, a large area to be implemented. In a hand-held portable two-way radio, the real estate is at a premium. One of the improvements over the prior art is that all alphabetic characters can be reproduced with the conventional phone keypad. Thus, a savings in real estate area is accomplished by not requiring a single key per each letter. This new approach is also cheaper and more reliable than the prior art.

The keypad 104 contains the traditional alphanumeric keys and two special keys in the positions generally occupied by the "*" and "#" characters. In the preferred embodiment of the present invention, the keypad 104 is backlit to facilitate dialing under poor lighting conditions. Pressing the Light Key will light the keypad as well as the display.

The standard telephone keypad used to dial in telephone-interconnected portables contains three alphabetic characters on each key for numbers 2–9. For example, if key number 2 is depressed, then the number 2 or the letters A, B, and C could be cycled on the display. If the key is momentarily depressed, then one letter will be displayed at a time. The two letters that are missing on the keypad, Q and Z, are displayed together with the letters on key numbered 7 or 9, respectively. This concept of using the letters on the keypad can be extended to enter alphabetic characters on the display to send them as text data or messages over the control channel or a separate voice channel.

There are three special purpose keys, the menu key, the step key and the light key. A menu key is used to select the desired function. The mode selection takes place by simply pressing the MENU key. The cursor advances from left to right while at the bottom of the display and from right to left while at the top of the display (counterclockwise). The operator stops the cursor at the desired function location, and it serves an an annunciator for the operational mode of the radio. Depressing the menu key momentarily causes the function in the next counterclockwise position to appear on the menu portion of the display. Moving through many functions may be accomplished by repeatedly depressing the function key or by scrolling. As the operator moves through the functions with the function key, only one function at a time will appear on the display. Also, only the functions the radio is programmed to handle will appear on the display. When in the telephone mode, the menu key functions as the hang-up key. If the operator selects a function where the radio requires additional information from the user, the digit locations for this information will flash until the necessary inputs are acknowledged by the radio controller.

The step key is used to select a specific value within a function. For example, it would be used to select one of several multiple systems or one of many subfleets, etc. Similar to the menu Key, the Step Key can move through the function in single steps by momentary presses, or it will scroll through if pressed continuously. The STEP key is also used to allow alpha characters to be directly inputted from the keypad. After the STEP key is depressed, then any alpha character can be selected by simply depressing the proper key. Alternatively, numeric characters could also be included in the sequence. Multiple momentary activations of the keypad while in this mode will cycle the three letters shown on the selected key. The proper letter is automatically entered after the operator stops cycling them.

In portable applications, the light key may be used to light the display when there is insufficient light available for viewing. When depressed, the display will light and remain lit for several seconds and automatically shut off. If other keys are depressed during the several-second period, the display will remain lit for several seconds after the last key is depressed. The light can also be turned off by successive actuation of the Light key. It will be used as an on/off key. If pressed, the display will remain lit until the key is pressed again to turn it off, or the time-out period occurs.

A telephone interconnect key will occupy the "#" space. It will be used to initiate or answer telephone calls. It can also be used where the "#" key is required. A trunked mode "home" key will occupy the "*" space. It can be used to exit a function and return directly to the trunked system/fleet and subfleet the radio was in prior to entering that function. Pushing the key brings the cursor directly back to the subfleet position.

As mentioned above, a menu portion borders the alpha-numeric display portion of the display 102. Each mode is selected through the menu key on the keypad. Each mode is represented by an acronym which are defined as follows:

PVT—Private Conversation
ALERT—Call Alert
SUB—Subfleet Select
SCN—Scan
STS—Status
MSG—Message
SYS—System
LOCK—Keypad Lock While the particular acronyms shown above have meaning only in the context of a particular trunked radio system or in systems having particular features, the concept of providing functions activated by a circular cursor movement around a display may be advantageously employed in a large variety of radio systems having a variety of system level categories of operation.

The System Select position (SYS) is used to define trunked system/fleet status, conventional repeater operation, and conventional talkaround operation. The Subfleet Select position (SUB) is used to display trunked subfleet status. In a trunked radio, the subfleet is an assignable alphabetic character from A-P. The subfleet is changed by selecting the SUB cursor position on the display, then by depressing the STEP key, the alphabetic subfleets will change momentarily or continuously. However, the subfleet letters are also entered via the keypad for quick subfleet selection. If a key is held depressed, the three letters on the key will cycle on the display 102. Thus, the operator makes its selection by releasing the key to display one of the three letters at a time. For example, if key #5 is depressed in the subfleet mode, then the letters J, K, and L will be cycled on the display 102. If the key is momentarily depressed, then one letter will show up at a time.

In a convention portable radio, the condition of certain functions could be determined by visually inspecting the knobs and keys of mechanically-controlled radios. These are considered continuous functions. These functions include: Trunked System/Fleet (SYS), Conventional Repeater Operation, Conventional Talkaround Operation, Subfleet (SUB), Status (STS). There are other functions that are brief in nature. The operator enters the function, performs the task, and exits immediately. These are momentary modes. They are Private Conversation (PVT), Call Alert (ALERT), and Message (MSG). The values of continuous functions will always visible on the display. The operator will know the radio's condition at a glance. The only exception will be when a telephone call is made. The phone number will occupy all eight positions of the display. However, this is not a problem since the telephone mode itself is momentary. The operator does not need to know the radio's condition while in the telephone function. After the radio operator "hangs-up", the continuous function values will automatically reappear. The momentary function values will only be visible while the momentary function is enabled. Under general conditions, the operator only needs to know whether any momentary functions are enabled. He does not need to select a trunked system/fleet. The operator moves to System Selection function (SYS) via the menu key and enters the desired trunked system/fleet via the keypad or STEP key.

When using the STEP key, the first alpha character will scroll only through the subfleets that are valid for that particular system/fleet. When using the keypad, the first alpha character associated with a key is entered into the display when a key is initially pressed. Pressing the key a second time brings up the second associated alpha character. A third press brings up the third character. A fourth press brings the first character back, and so on. For example, assume a user wants to enter subfleet "C" with the keypad. "C" is the third alpha character on keypad Key No. 2. Pressing Key No. 2 initially will bring up "A." Two more presses will bring up "C." Pressing the No. 2 key a fourth time would bring "A" back up again.

To select conventional repeater channels or talkaround channels, the operator must first move to the System Select (SYS) position via the menu key. From the System Select function (SYS), the operator could be able to select a large number of different "systems" both conventional and trunked. In one embodiment of the present invention, the user has the option to separately group his conventional repeater channels and talkaround channels such that the trunked systems are followed by all repeater channels and then all talkaround channels, or vice versa. Or, the could arrange his list so that the conventional repeater channels and their associated talkaround channels are paired off such that the trunked systems are followed by the repeater and talkaround channel for the first receive frequency, and then the repeater and talkaround channel for the second receive frequency, etc. Conventional repeater channels and talkaround channels will be distinguishable from each other and from trunked systems/fleets by use of the abbreviations "RP" and "TA" that represent repeater and talkaround respectively. The operator can access any system directly by pressing the STEP key or simply by pressing the desired system number on the keypad. For example, to select system 22, the operator would press the STEP key or the number 2 key twice.

The status code number is a number which is generated by the user of the portable device and it is periodically transmitted to the system central control unit, whenever the radio transmits a message or whenever the radio is polled by the central control. The status could be used to indicate that the radio is temporarily out of service, or is on a service call, etc. To update the Status code number, the operator first selects the Status function (STS) via the menu key. The current Status Code number will be visible since it is continually displayed except during momentary functions. When a momentary function is selected, the status code will blank out and automatically reappear when a momentary function is exited. The operator then enters a new Status Code number via the keypad of STEP key. If an incorrect Status Code number is entered, the operator simply re-enters the correct number via the keypad or STEP key since the status is transmitted when the PTT is pressed, not when a new status is selected. Upon receipt of acknowlegement, the three-letter abbreviation for "Status" (STS) will disappear and the subfleet abbreviation (SUB) will appear. This tells the operator that the Status transmitted was properly received and acknowledged and that he is automatically reverted to, and operating in, the Subfleet Select position. When in the conventional mode, the cursor will revert to SYS after a Status call.

If acknowledgement is not received from the receiving unit, the sending unit will automatically retry until it "times out". The retry time period is four seconds. After the retry "times out", the three-letter abbreviation will begin to flash. The flashing abbreviation is an indication to the operator that something is wrong (his Status update was not acknowledged) and that he is required to take some action (either retransmit in an attempt to gain acknowledgement or move from the Status function and try again later).

If the operator does not receive acknowledgement, and moves from the status function, the display will revert to the prior status. Since the new status did not get through, the operator's unit should display the same status as the dispatcher's unit. If acknowledgement is not certified from the base unit, the portable or mobile unit automatically retransmits the data message. This is the reason for the delay between release of PTT and the flashing unacknowledged indication mentioned earlier. The radio will retry until it times out (four seconds).

Both the trunked mode and the conventional mode have the ability to send status data.

To send a Message Code number, the operator first moves to the Message function (MSG) via the menu key. When the message function is selected, the numeric character position (not the function abbreviation) will flash on and off after a 300-500 millisecond delay. The delay prohibits the function from being activated when the operator is simply passing through the function to select another. The flashing character position indicates to the operator he is to enter a code number. The flashing will continue until a code number is entered or a new function is selected. The operator enters his Message Code number via the keypad or STEP key. Once an entry is made, the flashing will cease and the code number is displayed.

If an incorrect number is entered, the operator simply re-enters the correct number via the keypad or STEP key since the message is transmitted when a push-to-talk (PTT) is pressed, not when entered onto the display. Upon receipt of acknowledgement, the three-letter abbreviation (SUB) will appear. This tells the operator that the message was properly received and acknowledged and that he is automatically reverted to, and operating in, the Subfleet Select position.

If acknowledgement is not received from the receiving unit, the sending unit will automatically retry until it times out. The retry time period is four seconds. After the retry times out, the three-letter abbreviation will begin to flash. The flashing abbreviation is an indication to the operator that something is wrong (his message was not acknowledged) and that he is required to take some action (either retransmit in an attempt to gain acknowledgement or move from the message function and try again later).

Both the trunked mode and the conventional mode will have the ability to send message data. To send Text data, the operator first moves to the Subfleet Selection position via the menu key. The operator then enters the letter "T" in the Subfleet Select position via the keypad or STEP key. The "T" represents Text data. At this point, the operator can enter Text data via the keypad. To allow "Q" and "Z" (not on keypad) to be entered, the 7 key scrolls "PQRS" and the 9 key scrolls "WXYZ." When Text communications are completed, the operator must exit the Text mode by depressing the * (home) key of the Subfleet Selection position and then the appropriate Subfleet or Channel will appear on the display. If the operator neglects to exit the Text mode, two-way voice communications cannot be sent or received on data only channels. When a Text transmission is received while in the Subfleet mode, the Subfleet value and the letter "T" will alternately flash to indicate a Text transmission is waiting. Alternate flashing will occur when a Subfleet call is received while in the Text mode. The user may reject received text at all times.

The entry system of the present invention also provides the ability to implement direct radio to radio communication. To initiate a Private Conversation, the opertor first selects that function (PVT) with the menu key. Since the operator is capable of initiating a Private Conversation to only one other unit, he pushes PTT and begins conversation. If the operator makes an entry error, he can correct it by simply re-entering a new number with the keypad or STEP key.

When a Private Conversation call is received, the operator will hear an alert tone followed by a voice transmission from the calling party. The alert tone lets the operator know the transmission is a Private Conversation call. The recipient of a Private Conversation call can reject the call if desired. Pressing the "Home" key or PTT will reject the call and restore the display to its condition prior to receipt of the call. To answer the call, the operator moves to the Private Conversation call function via the menu key. Since the Private Conversation function is directly to the right of the Subfleet Select "Home" position, the operator will usually need to press the menu key only once. Since there is no calling ID selected (unlike the mobile mechanical version that shares a Subfleet position), the operator does not need to declare to the radio whether he is initiating or answering a Private Conversation. He just selects the function.

When the Private Conversation call is returned, the initiator will hear an alert tone. This audible indication lets the initiator know the call recipient activated the Private Conversation function and that the privacy loop is now complete. After the Private Conversation is over, the operator moves from that function via the function key or "Home" key. If the operator neglects to exit the function, the radio will be incapable of sending or receiving subfleet calls.

Figure 2:
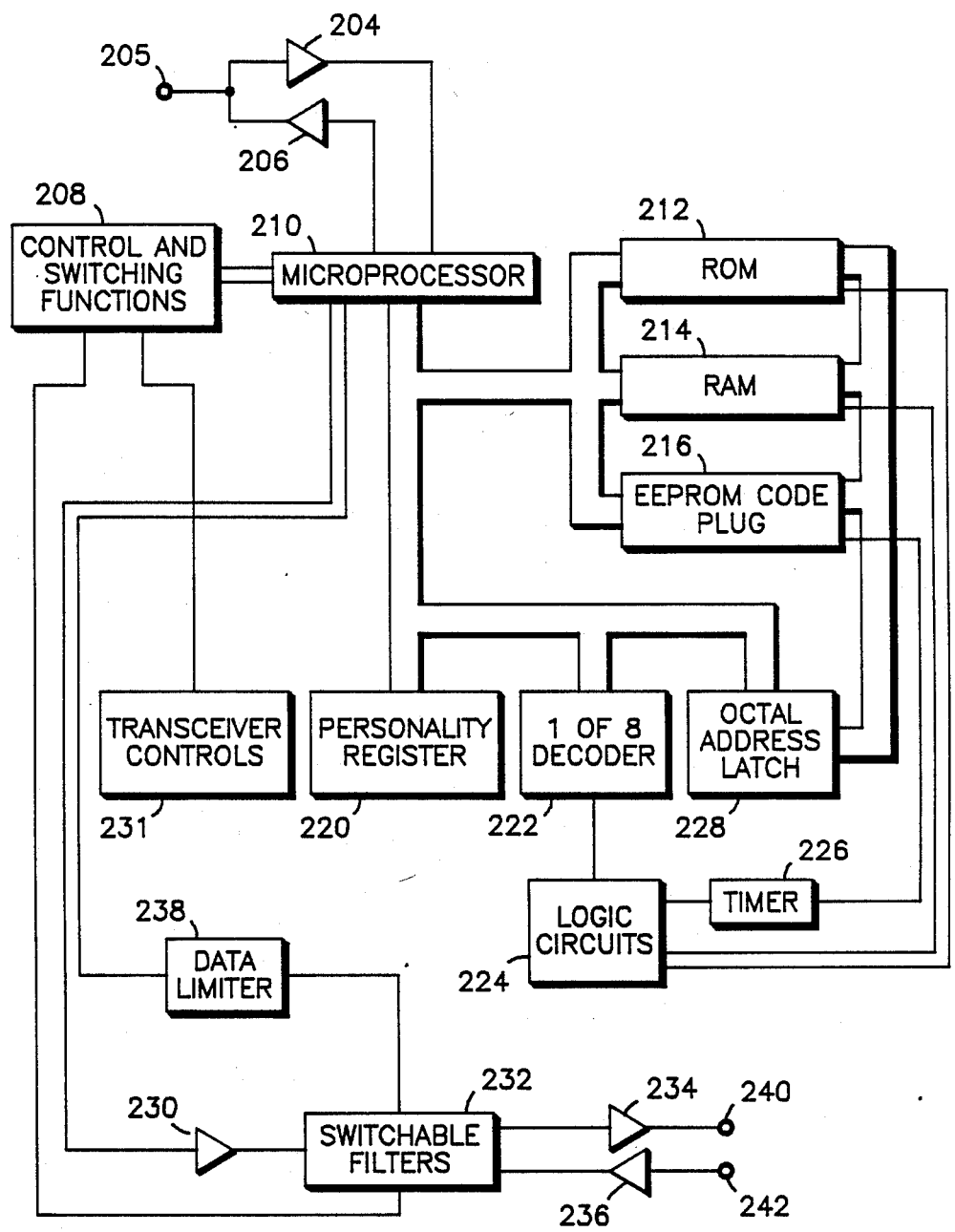
FIG. 2 is a schematic and block diagram of the controller which includes the microprocessor processing portion of the alphanumeric entry system of the present invention.

FIG. 2 shows a block diagram of the control portion of a two-way radio which utilizes the entry system of the present invention. The control portion of the two way radio is centered around the operation of microprocessor 210. The microprocessor 210 communicates with the microcomputer 110 of FIG. 1 via a serial link (not shown) which is coupled to microprocessor 210 via terminal 205 and the bus transceiver formed by buffers 204 and 206. Buffers 204 and 206 are coupled to the microprocessor 210 through the SCI port of the microprocessor. A series of switches and control latchs 208 are coupled to, and controlled by the microprocessor 210. The switchs and control latchs 208 are altered, depending on whether data is being sent or received. They are coupled to the transceiver control 231 and a bank of switchable filters which interface the data portion of the radio depicted in FIG. 2 to the analog transceiver portion of the radio (not shown). The switchable filters 232 couple to a limiter 238 and a received data buffer 236. The limiter 238 and the received data buffer 236 couple data signals from the discriminator of the transceiver to the microprocessor 210 via the switchable filters 232. Buffer 234 couples the filtered data signals from microprocessor 210 to buffer 230 to the analog portion of the transceiver.

The controller 200 further includes a read-only memory (ROM) 212, a random access memory (RAM) 214, and an electronically erasable programmable read-only memory (EEPROM) 216 which are coupled to microprocessor 210 via a multiplexed address and data bus. The EEPROM 216 is used to store both permanent and temporary information for use by the microprocessor 210. The information stored by EEPROM 216 may include fleet/subfleet information and repeater frequency information as well as the information needed to implement the particular functions and personalities programmed in the radio.

The serial communication between the radio remote microprocessor 210 and the keypad/display 4 bit microcomputer is done over a serial data bus which is coupled between terminals 114 of FIG. 1 and 205 of FIG. 2 respectively. Several serial bus architectures and the logical command sequences for control could provide a flexible and simple interconnection scheme between microcomputer 110 of FIG. 1 and microprocessor 210 of FIG. 2, and the entry system of the present invention is not limited to a particular serial bus communication scheme. The radio microprocessor 210 controls and interprets the keypad commands generated by the circuit of FIG. 1. Also, microprocessor 210 generates display commands which are interpreted by the keypad/display microcomputer 110, and then translated to the LCD character set which is stored in the integrated ROM of microcomputer 110. In addition, the microprocessor 210 may also control several other vital radio functions not described herein in any great detail. Microprocessor 210 may be of the type MC68HC03 manufactured by Motorola, Inc. and is available from Motorola Semiconductor Products Inc., 3501 Ed Bluestein Blvd, Austin, Tex. 78721.

The radio remote control system 200 further includes a one-of-eight decoder 222 which decodes the logical address of microprocessor 210 via the data/address bus coupled to the logic circuits 224 and timer 226 necessary to selectively enable the EEPROM 216, the RAM 214 and the ROM 212. A personality register 220 is also coupled to the address/data bus and provides the unique identity of the radio for selective personality purposes. The data/address bus is also coupled to an octal address latch 228 which latches the low order address from the data/address bus for use by the EEPROM 216, the RAM 214 and the ROM 212. As will be apparant from the discussion below, the EEPROM is used to store the current state and status of the radio receiver as well as being used to temporarily store the data to be displayed by the circuit of FIG. 1. The EEPROM provides a permanent storage medium which may be modified by the microprocessor 210 under program or RF control. Therefore, operating states of the radio, as well as display information, will be retained even when the radio is powered down. The EEPROM 216 is also used to implement the keypad lock feature of the present invention and the keypad lock status is retained in this device. In the preferred embodiment of the present invention, EEPROM 216 is a 52B13 manufactured by SEEQ Technology Inc., 1849 Fortune Drive, San Jose, Calif. 00131.

Figure 3:
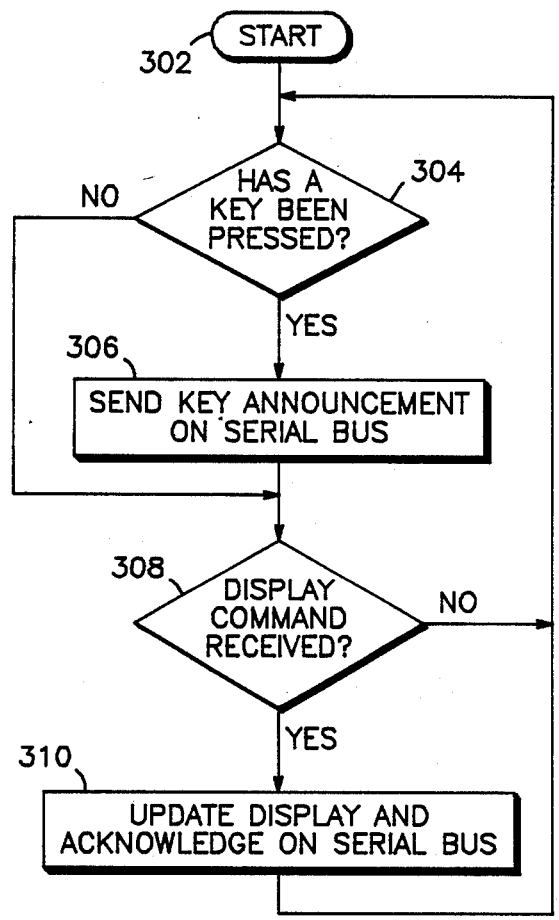
FIG. 3 is a flow diagram detailing the operation of the keypad/display microcomputer 110 of FIG. 1.

FIG. 3 is a flow diagram detailing the operation of the keypad/display microcomputer 110 described in conjunction with FIG. 1. As mentioned above, the microprocessor 110 interprets keystrokes generated by the keypad 104 and places these commands on the serial bus through terminal 114 of FIG. 1. The microcomputer 110 also receives display information through terminal 114 of FIG. 1 and routes these commands to the display 102. The keypad routine 300 starts at the entry point 302 which is entered on a regular periodic basis. Decision 304 examines the keypad port of microcomputer 110 to determine whether a key has been pressed. If it has, item 306 is selected to place the key identification information on the serial bus. If a key has not been pressed, decision 308 is selected to determine whether a display command is present at terminal 114 of FIG. 1. If a display command is present, item 310 is selected to update the display and send an acknowledgement on the serial bus. If a display command is not present on the serial bus, decision 308 selects decision 304 to begin the process again.

Figure 4:
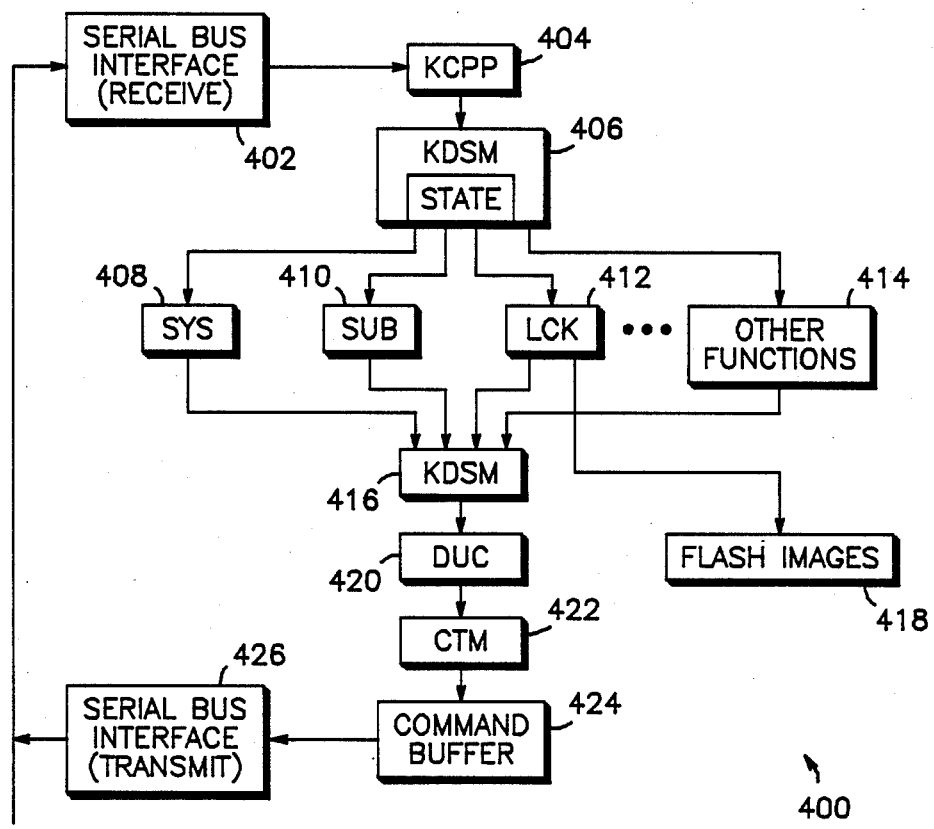
FIG. 4 is a state diagram detailing the operation of the microprocessor controller of the remote keypad processor of the present invention.

Referring now to FIG. 4, a combination hardware and state diagram 400 detailing the operation of the radio microprocessor 210 is shown in detail. According to FIG. 4, the serial bus information is couple into and out of the microprocessor 210 through the serial bus interface registers 402 and 426 respectively. The registers 402 and 426 are actually integral to microprocessor 210. Commands received from the serial bus are first processed by the keypad closure pre-processor (KCPP) 404 which is described in detail in conjunction with FIG. 7. KCPP is activated periodically, typically, every 23 ms. After pre-processing, item 406 is selected. Item 406 corresponds to the keypad display state machine (KDSM) which effects the specific operating state of the radio. KDSM is further described in conjunction with FIG. 8, briefly, however, KDSM determines if a change in radio state has been requested, and if it has, KDSM effects the state change. The state machine 400 then proceeds to one of the desired radio states such as SYS 408, SUB 410, LCK 412, or any other radio function represented by item 414. The state machine 400 proceeds from one of the functions above to KDSM_416 which provides an exit from the KDSM portion of the state machine. The display update controller (DUC) 420 is then selected to generate the information required to update the radio display. DUC is described in detail in conjunction with FIG. 11. The command transmit manager (CTM) 422 is then selected to format the information generated by DUC and send the information to the serial bus through the command buffer 424. CTM is described in detail in conjunction with FIG. 12.

Figure 5:
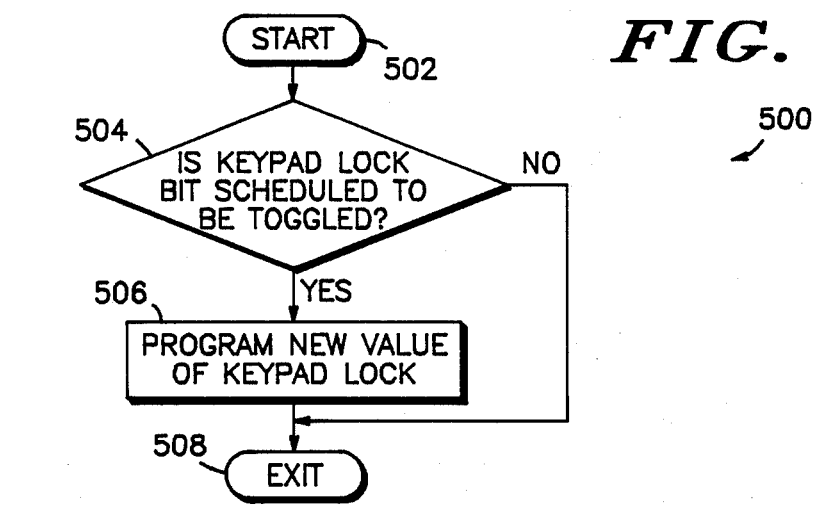
FIG. 5 is a flow diagram detailing the operation of the locking function in the context of the EEPROM programming of features described in conjunction with FIGS. 1 and 2.

FIG. 5 is a relatively simple flow diagram representing the EEPROM implementation of the keypad lock feature of the present invention. The routine of FIG. 5 is activated whenever the lock state 412 of FIG. 4 is activated. According to FIG. 5, decision 504 examines the keypad lock bit (a temporary RAM value) to determine whether a change in lock state has been requested. If a change in state has not been requested, decision 506 will exit the routine 500. If a keypad lock change in state is indicated, decision 504 will select item 506 to program the new value of the keypad lock into the keypad lock indicator bit located in the EEPROM which will retain the value until reprogrammed. It will be apparent to one of ordinary skill in the art that several EEPROM programming techniques may be advantageously employed with the present invention, including the techniques recommended in the manufacturer's data manuals covering these devices.

Figure 6:
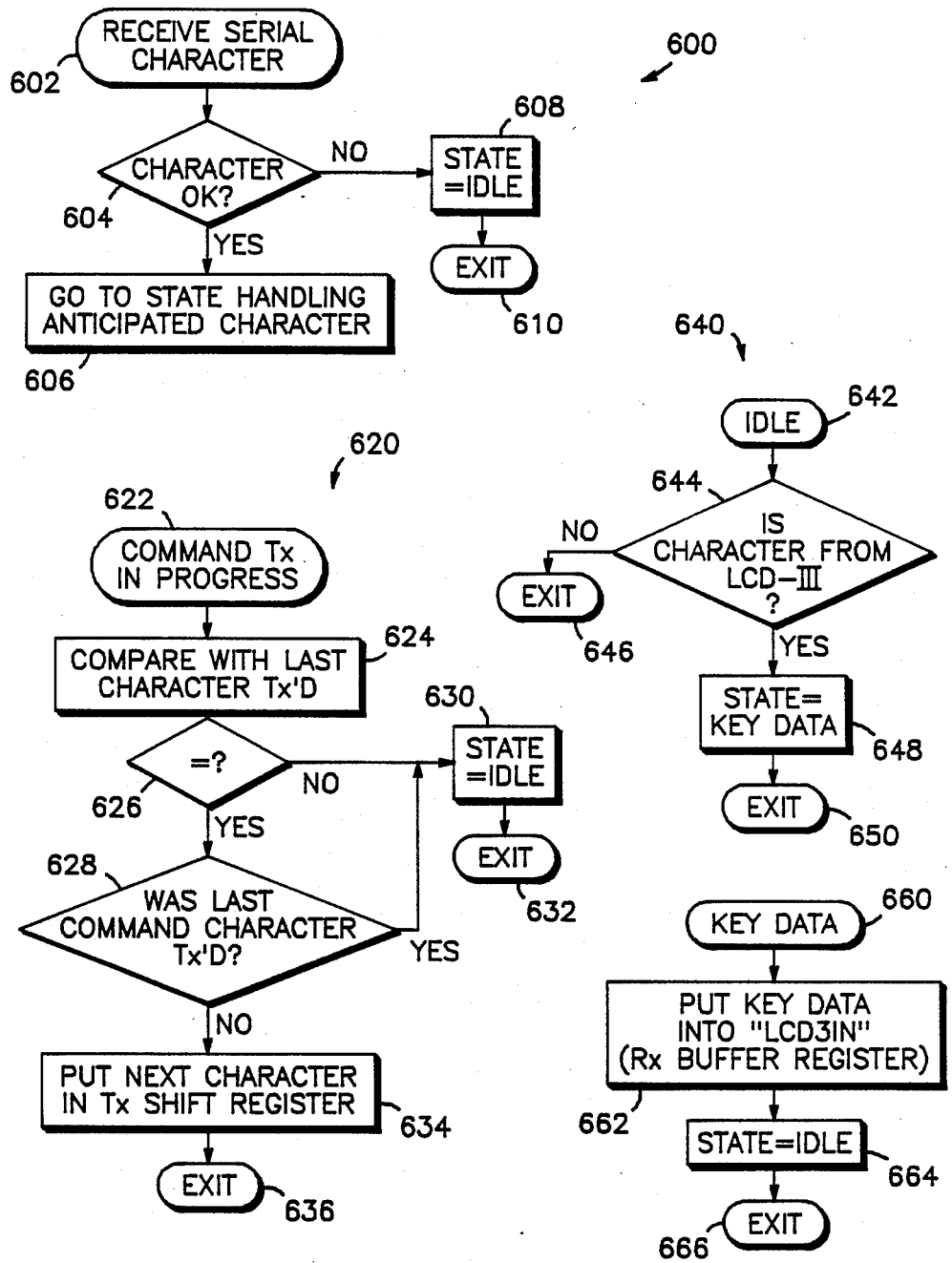
FIG. 6 is a series of flow diagrams detailing the operation of the serial communications interface portion of the remote keypad processor of the present invention.

Referring now to FIG. 6, there is shown a series of flow charts which describe the operation of the serial communication interface in the context of the present invention. According to FIG. 6, routine 602 is activated whenever a serial character is received on the bus. Decision 604 examines that character to determine whether the character was received intact. If the character is not intact, decision 608 selects item 608 which sets the state equal to idle, thus activating routine 642, the next time a good character is received. If the character is intact, item 606 is selected which examines the character to determine which state should be selected. Two states are possible at this point. The character will either correspond to key data or a command. If the character is key data, routine 660 will be selected. If the character is a command, routine 622 will be selected. Routine 622 is the command character processor. Item 624 compares the character to the last transmitted on the serial bus (to the display) and also examines the command character to determine whether it is the last command character to be transmitted. The character is tested by decisions 626 and 628. If the character is the last character to be transmitted, item 630 is selected to activate the idle routine 640. If another character is to be transmitted, item 634 is selected to put the next character into the transmit shift register before exiting the routine at 636. Referring now to the idle routine which begins at 642, the idle routine tests the character with decision 644 to determine whether the character corresponds to a "start of message character". If it was a start of message character, item 648 is selected to set the state equal to key data and select the key data routine 660. If not, decision 644 exits the routine at 646. The key data routine 660 is selected whenever a key data character is received. When activated, item 662 inputs the character into the receive buffer register and then selects item 664 to select the idle routine 640 before exiting at 666.

Figure 7:
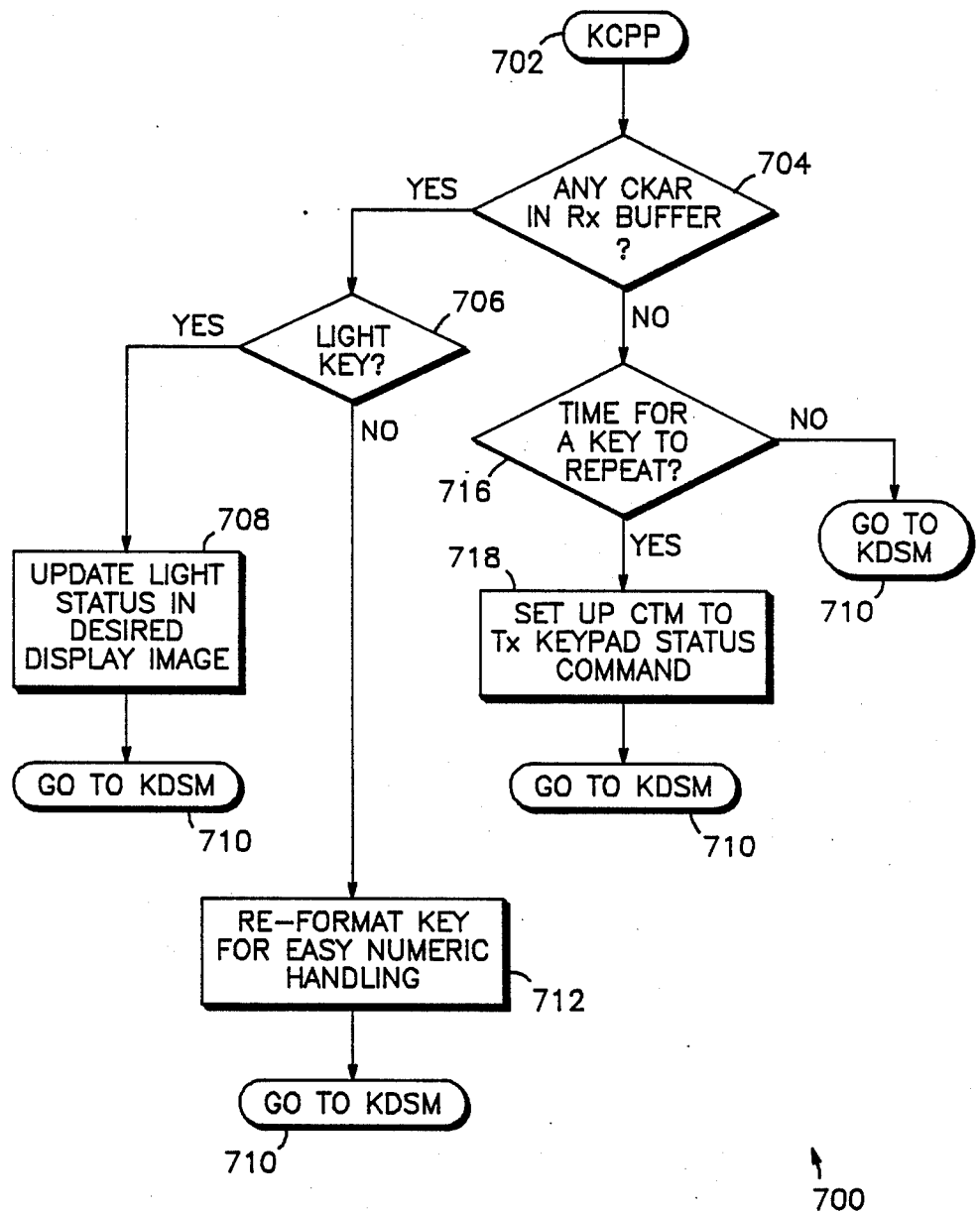
FIG. 7 is a flow diagram detailing the operation of the keypad closure preprocessing portion of the remote keypad processor of the present invention.

Referring now to FIG. 7, the operation of the keypad closure preprocessor KCPP is described in detail. KCPP begins with decision 704 which examines the receive buffer to determine whether a character has been received on the serial bus. If a character is present in the receive buffer, decision 704 selects decision 706 to determine whether the character corresponds to a light function key closure. If a light function key closure is detected, item 708 is selected to update the light status in the desired display image. Item 710 is then selected to route program control to KDSM. If decision 707 did not detect a light key closure, item 712 is selected to reformat the key for easy numeric handling. KSDM is then selected by item 710. If decision 704 does not detect a character in the receive buffer, decision 716 is selected to determine whether it is time for the key to repeat. If it is not time yet, decision 716 selects KDSM 710. If the key repeats, item 718 is selected to set up CTM is transmit the keypad status command. KDSM 710 is then selected.

Figure 8:
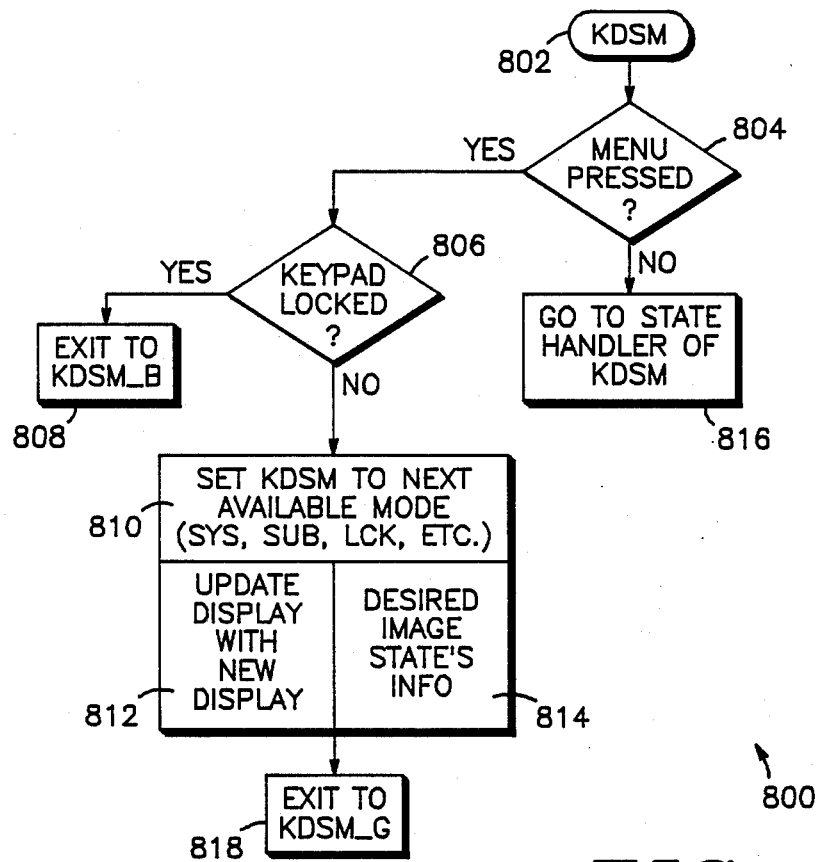
FIG. 8 is a flow diagram detailing the operation of the keypad display state machine in the context of the present invention.
Figure 10:
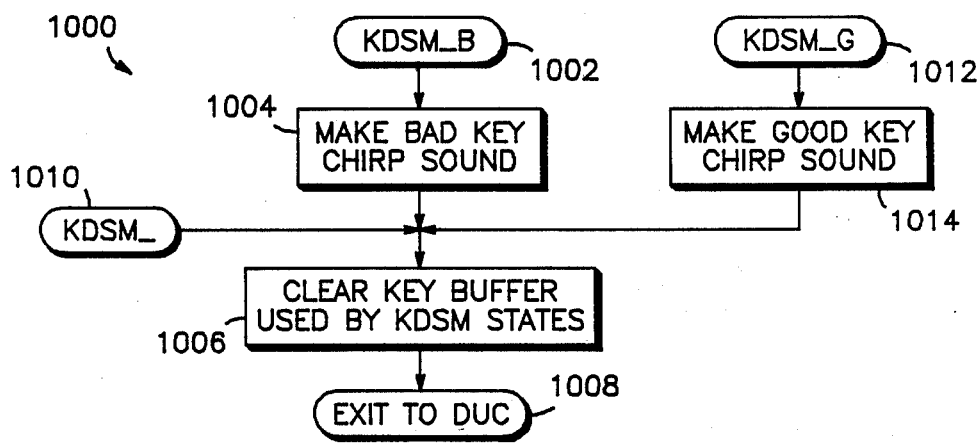
FIG. 10 is a flow diagram detailing the exit points from the keypad display state machine of FIG. 9.
Figure 9:
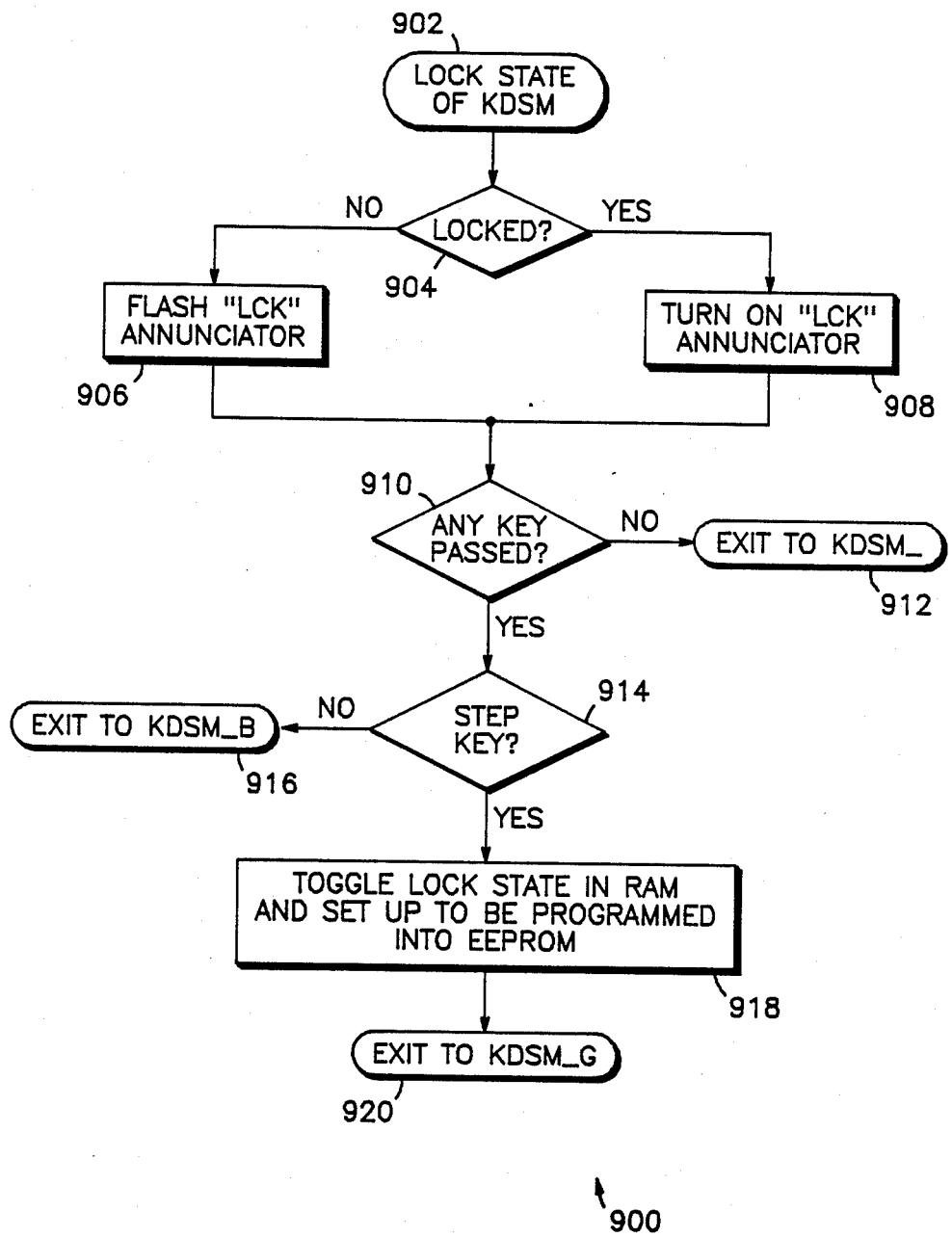
FIG. 9 is a flow diagram detailing the operation of the keypad lock function of the present invention.

Referring now to FIGS. 8 through 10, the keypad state machine KDSM is described in detail. KDSM begins with decision 804 to determine whether the "menu" key has been pressed. As mentioned above, the menu key causes the cursor to serially select the cursor controlled system functions. If the menu key has been pressed, decision 806 is selected to determine whether the keypad lock bit has been set in the EEPROM indicating that the keypad is locked. If the keypad is locked, item 808 is selected to generate a "bad chirp" sound by exiting to KDSM_B. If the keypad is not locked, decision 806 selects item 810 to select the state of the next available mode, such as SYS, SUB, LCK etc. Items 812 and 814 then update the temporary location in RAM with the new display and image information. Item 818 is then selected to exit to KDSM_G to generate a "good chirp" sound. If the menu key was not pressed, decision 804 selects item 816 to go directly to the state that KDSM was in.

Referring now to FIG. 9, a flow diagram detailing the keypad lock portion of the present invention is described in detail. The lock state is entered at 902 whenever the lock state is toggled according to the method mentioned in conjunction with FIG. 1. Decision 904 examines the keypad lock bit of the EEPROM to determine if the keypad has been locked. If the keypad has been locked, item 908 is selected to activate the lock icon LOCK on the display 102 of FIG. 1. If the keypad lock bit is not set, the LOCK icon is flashed. Decision 910 is then selected to determine whether a key has been pressed. If not, the routine exits to KDSM_at 912. If the a key has been pressed, decision 914 is selected to determine whether it is the step key which has been pressed. Recall from the discussion in FIG. 1 which stated that the step key toggles the lock function. If the step key has not been pressed, the routine exits to KDSM_B at 916 to generate a "bad chirp" sound. If the step has been pressed, item 918 is selected to toggle the lock state in RAM and set the microprocessor to program the lock state into the EEPROM. The routine then exits to KDSM_G at 920 to generate a "good chirp" sound.

Referring now to FIG. 10, the various exits points of KDSM are described. KDSM_B begins at 1002 which selects item 1004 which activates the "bad chirp" sound. Item 1006 is then selected to clear the temporary key buffer used by the KDSM states, and then selects 1008 to exit to the Display Update Controller (DUC). Item 1006 may also be selected by the KDSM_silient entry point 1010 which is selected if a key has not been pressed. Whenever a key is pressed and the keypad is not locked, or whenever the keypad lock state is toggled, KDSM_G is selected at 1012. Item 1014 then activates the "good chirp" generator before selecting item 1006.

Figure 11:
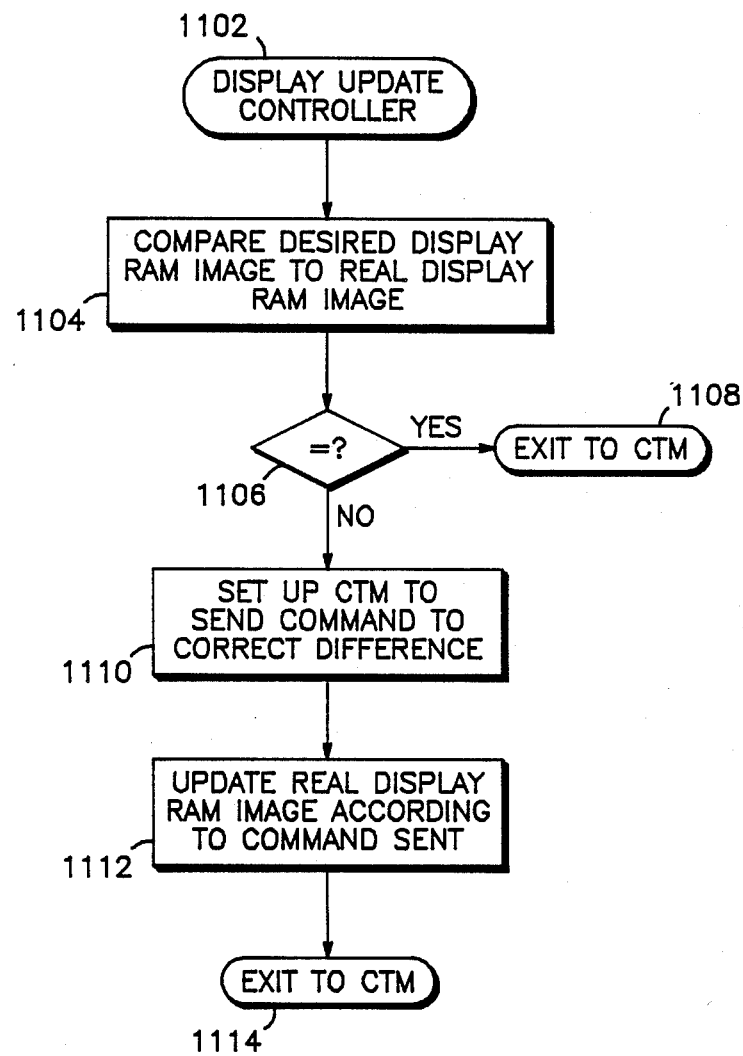
FIG. 11 is a diagram of the display update controller of the present invention.

Referring now to FIG. 11, there is shown the Display Update Controller (DUC) routine which is used to update information used to control the display 102 of FIG. 1. DUC is entered at 1102 after being selected by the KDSM state machine. Item 1104 examines the desired image (indicated by KDSM) to the current real display image. Decision 1106 compares the images, and if they are the same, decision exits this routine and selects the Command Transmit Manager (CTM) at 1108. If the images are not the same, item 1110 then generates the new information to correct the difference. Item 1112 causes the display and RAM to be updated in accordance with the information generated by 1112 before exiting to CTM at 1114.

Figure 12:
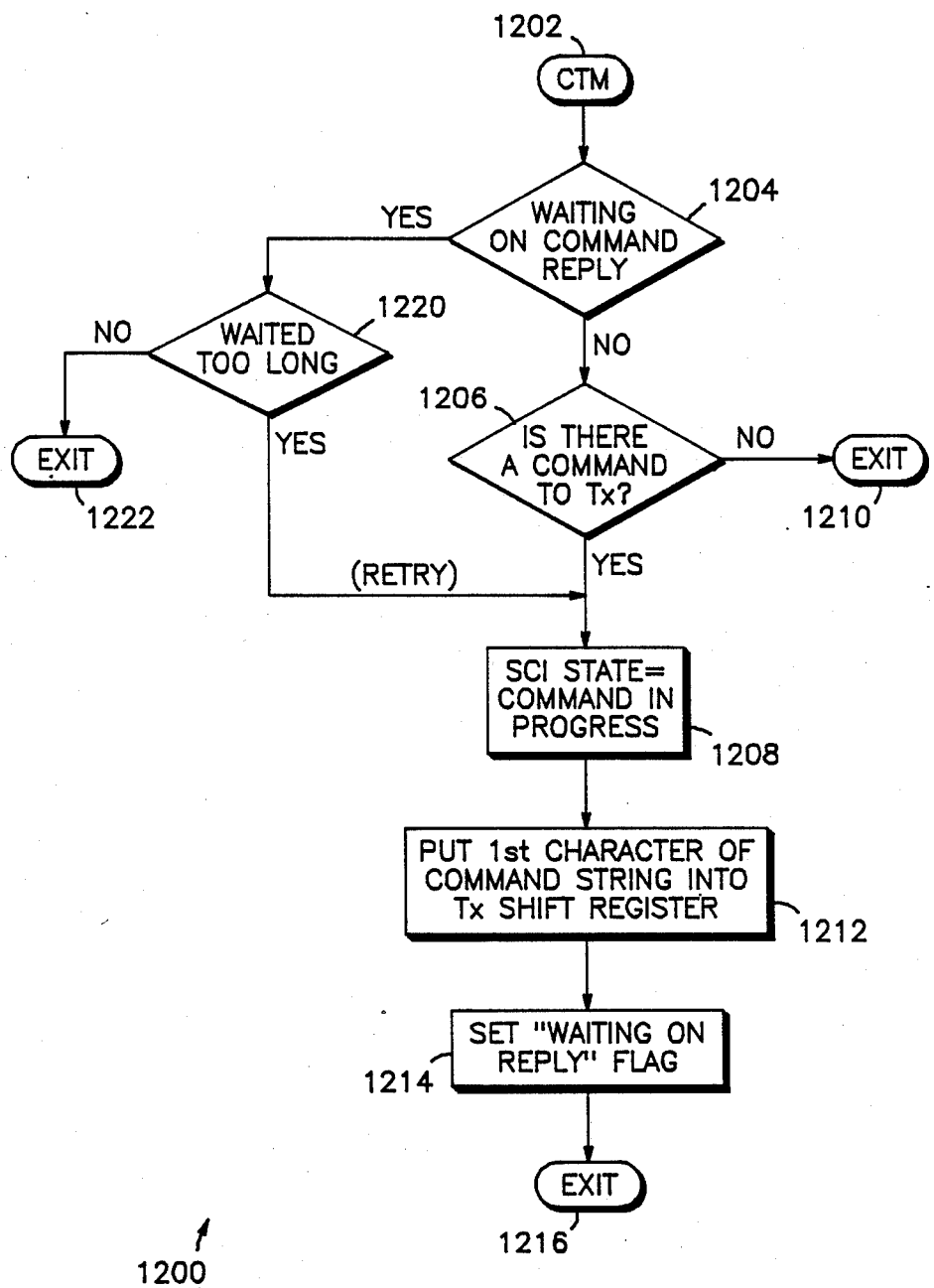
FIG. 12 is a diagram of the command transmit manager of the present invention.

Referring now to FIG. 12, the Command Transmit Manager (CTM) is described in detail. CTM is the portion of the present invention which places commands on the serial bus for display or processing by the keypad/display microcomputer 110 of FIG. 1. CTM is entered at 1202 which selects decision 1204 to determine whether the system is waiting on a command acknowlegement from the keypad microprocessor 110. If the system is waiting for an acknowlegement, decision 1220 is selected to time the wait period. If the predetermined time period is exceeded, decision 1220 selects item 1208 to set the serial communications interface (SCI) state equal to a command in progress state. If the time period has not elapsed, decision 1220 exits the routine at 1222. Once the SCI state has been set, item 1212 is selected to put the first character of the command string into the transmit shift register. The "waiting on reply" flag bit is then set by item 1214 before exiting at 1216.

In summary, an alphanumeric entry system having a keypad lock feature has been described in detail. The alphanumeric entry system of the present invention utilizes a keypad and display unit which are controlled by a dedicated microprocessor which communicates via a serial bus. A radio remote microprocessor is coupled to the keypad microprocessor via the serial bus and is used to send and receive information to be displayed or executed. The radio remote microprocessor also interfaces to the radio receiver and transmitter to send and receive information via RF link. The radio remote microprocessor cooperates with an EEPROM which is used to store the radio operating status even when the radio is turned off.

The present invention utilizes a conventional telephone type keypad which is configured with several function keys. The display contains an alphanumeric entry portion as well as a menu portion. The menu portion comprises a series of icons which are disposed around the periphery of the display. The icons correspond to levels of system operation and are sequentially selected via cursor control which is activated by one of the function keys on the keypad. One of the icons corresponds to a keypad lock function which prevents the keypad form being activated inadvertently. Accordingly, an alphanumeric entry system having a keypad locking feature has been described. Other embodiments and uses of the system will be apparent to one of ordinary skill in the art without departing from the spririt and scope of the present invention.

We claim:

1. A keypad entry system for use with a two-way radio having a receiver and transmitter means, said keypad entry system including a locking mode for electronically disabling the operation of said keypad entry system said system comprising:

keypad means having an alphanumeric portion having keys which represent alphabetic and numeric values, and said keypad means further including a function key portion comprising a plurality of function keys;

display means having an alphanumeric display portion and a menu display portion, said menu portion comprising icons representing categories of system operation, said icons being sequentially stepped under the control of one of said function keys on said keypad means, wherein one of said icons corresponds to a keypad lock function, and wherein said keypad lock function is selectively actuated by another of said function keys when said keypad lock function icon is displayed; and first microprocessor means, including data bus interface means, said microprocessor coupled to said keypad means and said display means for decoding commands generated by said keypad means and displaying them on said display means or placing them on said data bus interface means, or decoding commands received from said data bus interface means and displaying then on said display means, and said first microprocessor means inhibiting the icons being stepped when said keypad lock function is actuated.

2. The keypad entry system as described in claim 1 wherein said alphanumeric portion of said keypad means includes individual keys which represent both numerical and alphabetical characters.

3. The keypad entry system as described in claim 1 further including means for decoding the multiple characters represented by each alphanumeric key.

4. The keypad entry system of claim 1 wherein said icons of said menu portion of said display means correspond to operating modes trunked or conventional radio systems.

5. The keypad entry system of claim 1 wherein said icons are selected by means of a cursor which sequentially activates each icon, under the control of a first function key.

6. The keypad entry system of claim 1 wherein radio functions corresponding to particular icons are sequentially selected by repeatedly depressing said second function key.

7. A method for alphanumeric entry in an alphanumeric entry system having a display portion and a keypad portion wherein said display portion includes an alphanumeric display portion and a cursor activated menu portion, said menu portion having icons corresponding to levels of system operation, wherein one of said icons corresponds to a keypad lock function, and said keypad portion including a plurality of function keys and alphanumeric keys wherein each alphanumeric key represents a numeric and several alphabetic characters, further whereby the display and keypad are controlled by a local mircoprocessor which communicates with a radio controller microprocessor through a serial bus, said method comprising the steps of:

(a) depressing a first function key to sequentially move a cursor to select an icon which activates an area of system operation corresponding to a desired system function;

(b) enabling the desired system function by transmitting the value of the function to the radio controller microprocessor over the serial bus;

(c) displaying the function selected by said icon by transmitting a command corresponding to the display function from said radio controller microprocessor to said keypad and display microprocessor and continuously displaying said system icon;

(d) directly entering alphanumeric characters by depressing a key corresponding to a group of characters, wherein characters within the group are serially selected by repeatedly depressing the key;

(e) entering the alphanumeric by transmitting the value of the function to the remote controller microprocessor over the serial bus;

(f) displaying the alphanumeric character by transmitting a command corresponding to the alphanumeric key entry from said remote controller microprocessor to said keypad and display microprocessor, said display microprocessor controllling the display and displaying the alphanumeric character at a particular location in the display;

(g) selecting the keypad lock by depressing said first function key until said lock icon is selected;

(h) depressing a second function key to activate said keypad locking function;

(i) generating a "bad chirp" sound if any key is depressed while the keypad is locked; and (j) depressing the second function key a second time to deactivate the said keypad locking function.

* * * * *